United States Patent
Bailleux

[15] 3,704,029
[45] Nov. 28, 1972

[54] REAR WHEEL ARRANGEMENT HAVING TRAILING ARMS FOR AN AUTOMOBILE VEHICLE

[72] Inventor: Gilles Bailleux, Sartrouville, France

[73] Assignees: Automobiles Peugeot, Paris; Regie Nationale des Usines Renault, Billancourt, both of France

[22] Filed: Nov. 4, 1970

[21] Appl. No.: 86,702

[30] Foreign Application Priority Data

Feb. 2, 1970 France................7003510

[52] U.S. Cl..................................280/124 R, 267/15
[51] Int. Cl................................................B60g 7/00
[58] Field of Search.........280/124 R; 267/15, 20, 21, 267/6

[56] References Cited

UNITED STATES PATENTS 2,885,219  5/1959  Paton.....................280/124 R
3,201,142  8/1965  Dangauthier......280/124 A X Primary Examiner—Philip Goodman
Attorney—Burns, Doane, Swecker & Mathis

[57] ABSTRACT

Rear wheel arrangement for an automobile vehicle having a cross-member to which are pivoted trailing arms carrying the independent wheels of the vehicle. Each end of the cross-member is connected to the suspended part of the vehicle by a resiliently yieldable pivotal device. The latter comprises, on one hand, an elastomer sleeve interposed between coaxial members respectively integral with the suspended part and the cross-member, and, on the other hand, two brackets respectively integral with the cross-member and the suspended part and packing means of resiliently yieldable material interposed between and fixed to the brackets. The packing means is offset with respect to the pivot axis of the pivotal device and adapted to work mainly under shear stress.

15 Claims, 5 Drawing Figures

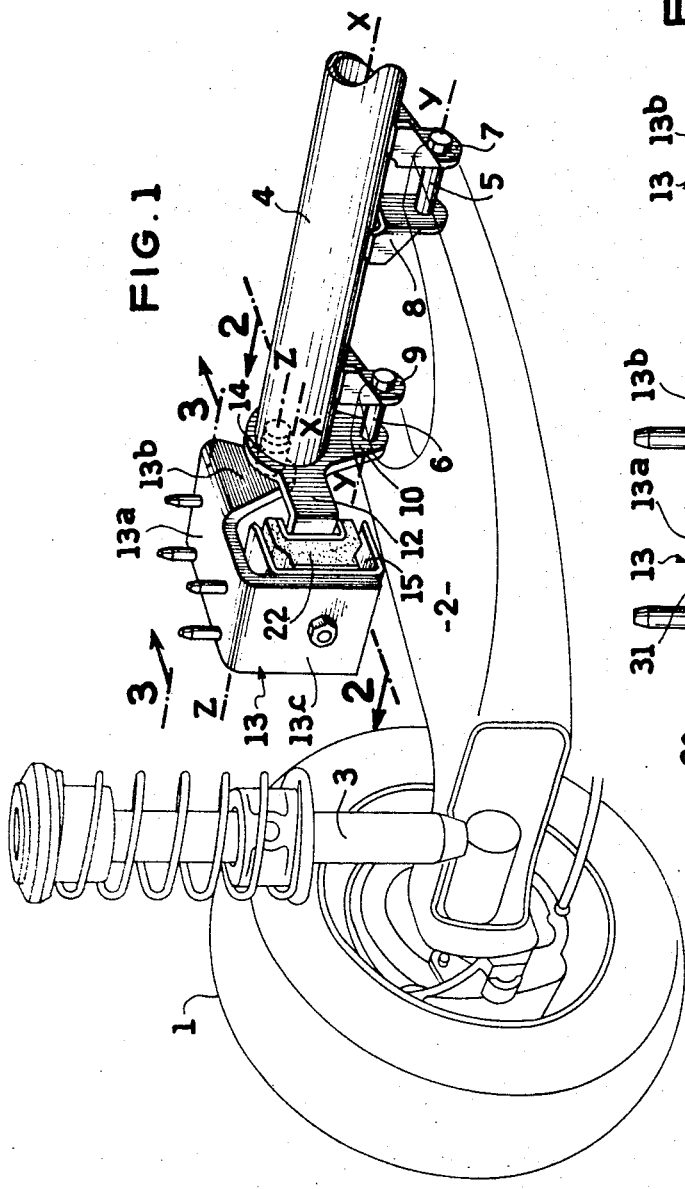
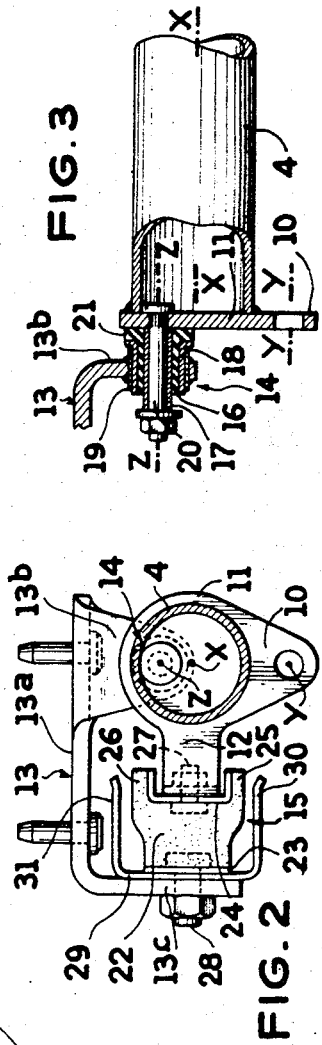

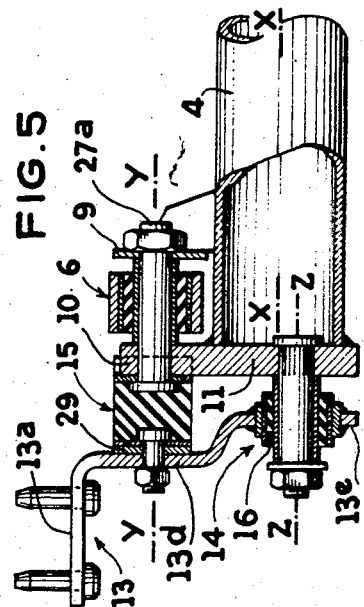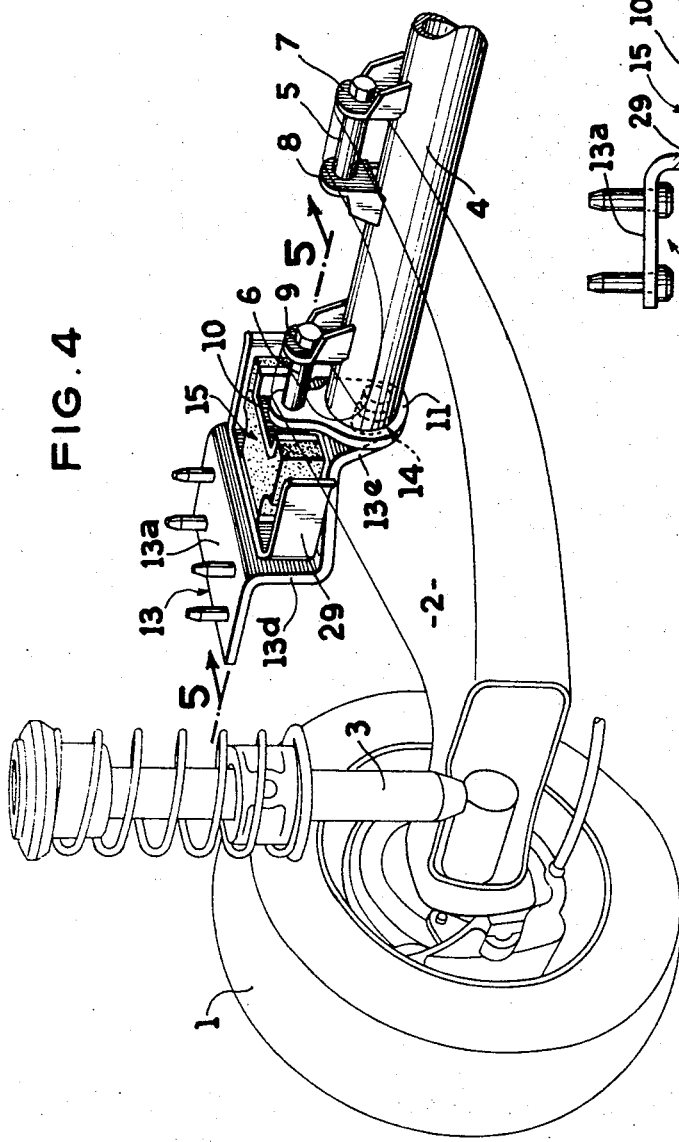

REAR WHEEL ARRANGEMENT HAVING TRAILING ARMS FOR AN AUTOMOBILE VEHICLE

The present invention relates to rear wheel arrangements for automobile vehicles of the type having independent wheels and trailing links or arms pivoted to a common cross-member mounted resiliently with respect to the suspended part (body or chassis) of the vehicle.

Rear wheel suspension arm arrangements are already known, in particular from the French Pat. No. 1,292,334 in which the pivot of the arms is connected to forks, integral with the chassis or body of the vehicle, by two resiliently yieldable pivotal connections comprising a mass of elastomer material compressed between two coaxial tubes. This arrangement affords a fairly good filtering of the wheel impacts but has two serious drawbacks. First, it requires high precision in the assembly of the pivotal connection of the cross-member so as to ensure a correct orientation of the cross-member. Secondly, it does not permit precisely controlling and regulating the stiffness which governs the angular movement of the cross-member, owing to the small diameter of the resiliently yieldable pivotal connection.

The object of the present invention is to remedy these drawbacks.

The invention provides a rear wheel arrangement for an automobile vehicle of the type having independent wheels and trailing arms pivoted to a common cross-member connected at both ends to the suspended part of the vehicle by a resiliently yieldable pivotal device, wherein the resiliently yieldable pivotal device comprises a sleeve of elastomer or the like fixed to two coaxial members which are respectively integral with the cross-member and with the suspended part and whose axes define the pivot axis of the cross-member, and a packing means of resiliently yieldable material fixed to two brackets which are roughly parallel and respectively integral with the cross-member and the suspended part, said packing means being offset with respect to said axes and working mainly under shear stress.

According to another feature, the packing means is so shaped as to constitute an abutment limiting in the known manner the angular movement of the cross-member.

Further features and advantages of the invention will be apparent from the ensuing description with reference to the accompanying drawings.

In the drawings:

FIG. 1 is a perspective view of one half of a rear wheel arrangement according to the invention for a vehicle;

FIG. 2 is a sectional view taken along line 2—2 of FIG. 1;

FIG. 3 is a sectional view taken along line 3—3 of FIG. 1;

FIG. 4 is a perspective view of half a rear wheel arrangement according to a modification, and FIG. 5 is a sectional view taken along line 5—5 of FIG. 4.

Reference will first be had to FIGS. 1-3 for the purpose of describing a first embodiment of a rear wheel arrangement according to the invention in which each wheel 1 is disposed at the end of a suspension arm 2. The latter is connected to the body (not shown) by a supporting and damping device 3 and connected to a cross-member 4 having an axis X—X by two resiliently yieldable pivotal connections 5 and 6 having an axis Y—Y and respectively mounted between brackets 7,8 and 9, 10 integral with the cross-member 4 and depending vertically from the latter. The bracket 10 is formed by a lower extension of a plate or support element 11 constituting the end of the cross-member 4. The plate 11 has a horizontal lug 12 bent into an L-shape the free end of which is parallel to the cross-member 4.

The cross-member 4 is connected to a support 13, integral with the chassis through a resiliently yieldable assembly comprising a pivotal connection 14 and a packing means 15. The support 13 comprises three plane fixing faces 13a, 13b, 13c located in three planes perpendicular to each other.

The pivotal connection 14 has an axis Z—Z and comprises in the known manner a sleeve 16 of resiliently yieldable material which is vulcanized or otherwise adhered to an inner tube 17 and to an outer tube 18. The tube 18 is a drive fit in a bearing 19 integral with the support 13. A bolt 20, held stationary in the plate 11, locks the assembly when a nut mounted on the bolt is tightened against the inner tube 17. A shoulder 21 on the sleeve 16 absorbs the transverse forces transmitted by the cross-member 4.

The packing means 15 is constituted by a block 22 of resiliently yieldable material such as elastomer which is vulcanized or adhered to two plates 23 and 24. The plate 24 has two flanges covered by the resiliently yieldable material so as to constitute two stops 25 and 26. The block 22 is therefore roughly Y-shaped. It is fixed to the lug 12 of the plate 11 by a bolt and nut assembly 27 and to the support 13 by another bolt and nut assembly 28.

Interposed between the support 13 and the plate 23 is a bracket 29 having a lower branch 30 and an upper branch 31 which face and are spaced a short distance from, the stops 25 and 26.

It can be seen that this arrangement satisfies the purpose for which it was designed. Indeed, the resiliently yieldable pivotal assembly 14 requires less precision since the angular position of the cross-member 4 is governed mainly by the packing means 15 and not solely by the pivotal connection 14.

The stiffness in any rotational movement about the axis Z—Z of the connection between the cross-member 4 and the chassis is due both to the tangential shear stress in the pivotal connection 14 and to the shear stress in the packing means 15, the action of the packing means 15 being preponderant since the packing means is more remote from the pivot axis Z—Z. Therefore it is easier to control this stiffness than when it is afforded solely by the pivotal connection 14 whose diameter is of necessity rather small.

Limitation of the angular movement of the cross-member 4 under the effect of the maximum forces likely to be applied to the wheels is achieved by the contact between the stop 25 or 26 and the branches 30 or 31 of the member 29. It is also possible to adjust this limitation in a precise manner.

In the modification shown in FIGS. 4 and 5 similar reference numerals designate component parts similar to those shown in FIGS. 1–3.

In this modification, the brackets 7,8 and 9,10 integral with the cross-member 4 and to which the suspension arms are pivoted, extend vertically upwardly from the cross-member. The support 13 defines a horizontal plate 13a for fixing to the body or to the chassis of the vehicle and two roughly vertical faces 13d, 13e parallel to each other to which are respectively secured the packing means 15 and the pivotal connection 14.

The packing means 15 is disposed in alignment with the axis Y—Y of the pivotal connections 5 and 6 connecting the arm 2 to the cross-member 4 and connected to the member 10 by a bolt 27a which also locks in position the pivotal connection 6.

The resiliently yieldable pivotal connection 14 no longer has a flange for absorbing transverse forces, since the latter are absorbed directly by the compression of the resiliently yieldable block of the packing means 15.

Apart from the advantages of the preceding arrangement, this modification has the advantage of causing the packing means 15 to absorb directly the longitudinal and transverse forces transmitted by the wheel at a very short distance from the plane in which the body is connected, which improves the filtering of shocks and vibrations resulting from these forces.

Having now described my invention what I claim and desire to secure by Letters Patent is:

1. A rear wheel arrangement for an automobile vehicle, comprising a suspended part, a cross-member having two opposed ends, a first pivotal device pivotally connecting each end of the cross-member to the suspended part, independent wheels, trailing arms respectively carrying the wheels, and a second pivotal device having a first pivot axis and connecting each arm to the cross-member, said first pivotal device having a second pivot axis which is substantially in the same vertical plane as and spaced from said first pivot axis and constituting first means resiliently resisting pivotal movement of the cross-member about said second pivot axis, said first pivotal device comprising a first member, integral with the cross-member, a second member which is coaxial with the first member and integral with the suspended part, a sleeve of elastomer interposed between and fixed to the first member and second member, second means for resiliently resisting pivotal movement of the cross-member about said second pivot axis and comprising a first support element integral with the cross-member and a second support element integral with the suspended part, packing means including resiliently yieldable material and interposed between and fixed to the support elements and offset transversely of said second pivot axis and adapted and arranged to work mainly under shear stress when the first support element pivots with respect to the second support element about said second pivot axis.

2. A rear wheel arrangement as claimed in claim 1, wherein the first support element has a portion parallel to a portion of the second support element, said portions being fixed to the packing means.

3. A rear wheel arrangement as claimed in claim 1, wherein the cross-member carries at each of said ends a plate which constitutes a part of the corresponding second pivotal device which supports the first member and the first support element.

4. A rear wheel arrangement as claimed in claim 3, wherein the first bracket is combined with the plate in the form of a single piece.

5. A rear wheel arrangement for an automobile vehicle, comprising a suspended part, a cross-member having two opposed ends, a first pivotal device pivotally connecting each end of the cross-member to the suspended part, independent wheels, trailing arms respectively carrying the wheels, and a second pivotal device having a first pivot axis and connecting each arm to the cross-member, said first pivotal device having a second pivot axis and being resiliently yieldable and comprising a first member integral with the cross-member, a second member which is coaxial with the first member and integral with the suspended part, a sleeve of elastomer fixed to the first member and second member, a first bracket integral with the cross-member and a second bracket integral with the suspended part, packing means including resiliently yieldable material and fixed to the brackets and offset with respect to said second pivot axis and adapted and arranged to work mainly under shear stress, said packing means comprising a block of elastomer having a substantially U-shaped portion having branches which are substantially parallel to a line intersecting said ends of the cross-member, a first substantially U-section member, a second substantially U-section member disposed within the first substantially U-section member, the elastomer block being interposed between the two substantially U-section members, the first substantially U-section member having two branches adjacent the branches of the block, a clearance being provided between the adjacent branches whereby the branches of the first substantially U-section member constitute stops limiting angular movement of the cross-member about said second axis.

6. A rear wheel arrangement as claimed in claim 5, comprising a plate which adheres to the elastomer block, the elastomer block adhering to one of the substantially U-section members and the plate being fixed to the other of the substantially U-section members.

7. A rear wheel arrangement as claimed in claim 1, wherein the cross-member has a longitudinal axis and said first pivot axis is located below said longitudinal axis, and said second pivot axis is located above said longitudinal axis, the packing means being laterally offset in a substantially horizontal plane containing said longitudinal axis.

8. A rear wheel arrangement as claimed in claim 7, wherein the cross-member carries at each of said ends a plate which constitutes a part of said second pivotal device which supports the first member and the first bracket, said plate being laterally extended by an L-shaped lug having an end portion parallel to the cross-member, said packing means being secured to said end portion of the lug.

9. A rear wheel arrangement as claimed in claim 7, wherein the sleeve of elastomer has a radial flange, the cross-member has a face parallel to the radial flange and the suspended part has a face parallel to the radial flange, said flange being in a compressed condition between the face of the cross-member and the face of the suspended part and adapted to absorb lateral forces transmitted by the cross-member.

10. A rear wheel arrangement as claimed in claim 7, comprising a support which is disposed between the suspended part and the first pivotal device and has three fixing faces contained in three planes perpendicular to each other.

11. A rear wheel arrangement for an automobile vehicle, comprising a suspended part, a cross-member having two opposed ends, a first pivotal device pivotally connecting each end of the cross-member to the suspended part, independent wheels, trailing arms respectively carrying the wheels and a second pivotal device having a first pivot axis and connecting each arm to the cross-member, said first pivotal device having a second pivot axis and being resiliently yieldable and comprising a first member integral with the cross-member, a second member which is coaxial with the first member and integral with the suspended part, a sleeve of elastomer fixed to the first member and second member, a first bracket integral with the suspended part, packing means including resiliently yieldable material and fixed to the brackets and offset with respect to said second pivot axis and adapted and arranged to work mainly under shear stress, said cross-member having a longitudinal axis, said first pivot axis being located above said second pivot axis, the packing means being offset towards the upper part of the cross-member and substantially in alignment with said first pivot axis.

12. A rear wheel arrangement as claimed in claim 11, wherein the brackets have faces perpendicular to the longitudinal axis of the cross-member and the packing means is fixed between the faces of the brackets and adapted to work under shear stress and under compression so as to absorb lateral forces transmitted by the cross-member.

13. A rear wheel arrangement as claimed in claim 11, comprising an end plate on each end of the cross-member and a single element connecting each corresponding packing means to the end plate and locking the second pivotal device to the first bracket.

14. A rear wheel arrangement as claimed in claim 7, comprising a support which is interposed between the suspended part and the first pivotal device and has a first fixing face and two other fixing faces parallel to each other and perpendicular to the first face of the support.

15. A rear wheel arrangement for an automobile vehicle, comprising a suspended part, a cross-member having two opposed ends, a first pivotal device pivotally connecting each end of the cross-member to the suspended part, independent wheels, trailling arms respectively carrying the wheels, and second pivotal devices respectively connecting the arms to the cross-member, each second pivotal device having a first pivot axis, said first pivotal device having a second pivot axis which is spaced from the first pivot axis of the corresponding second pivotal device transversely of the first and second pivot axes and being resiliently yieldable, each first pivotal device constituting first means for resiliently resisting pivotal movement of the cross-member about said second axis and comprising a first member integral with the cross-member, a second member which is coaxial with the first member and integral with the suspended part, a sleeve of elastomer interposed between and fixed to the first member and second member and second means for resiliently resisting pivotal movement of the cross-member about said second axis and comprising means defining a first face connected to the cross-member to pivot with the cross-member about said second axis, means defining a second face rigid with the suspended part, said first face being radially offset from said second pivot axis and said second face being in spaced relation to said first face, and elastomer means having two spaced-apart faces respectively secured to said first face and second face, the dispositions of said first face and said second face with respect to said second axis being such that relative movement produced therebetween when the cross-member pivots about said second axis subjects the elastomer means to shear stress.

\* \* \* \* \*